United States Patent
Sander

(10) Patent No.: US 6,471,926 B2
(45) Date of Patent: Oct. 29, 2002

(54) METHOD OF USING AEROGEL HONEYCOMB CATALYST MONOLITHS FOR SELECTIVE CATALYTIC REACTION OF GAS PHASE CHEMICAL SPECIES

(76) Inventor: Matthew T. Sander, 10361 Stablehand Dr., Cincinnati, OH (US) 45242

( * ) Notice: Subject to any disclaimer, the term of this patent is extended or adjusted under 35 U.S.C. 154(b) by 49 days.

(21) Appl. No.: 09/294,127

(22) Filed: Apr. 19, 1999

(65) Prior Publication Data

US 2001/0033817 A1 Oct. 25, 2001

Related U.S. Application Data

(62) Division of application No. 08/761,649, filed on Dec. 6, 1996, now Pat. No. 5,972,254.

(51) Int. Cl.[7] .................................................. C01C 3/00
(52) U.S. Cl. .................... 423/237; 423/239.1; 110/345; 264/82
(58) Field of Search ................... 264/621, 82; 110/345; 423/237, 239.1

(56) References Cited

U.S. PATENT DOCUMENTS

| 5,534,236 A | * | 7/1996 | Woldhuis ..................... 423/237 |
| 5,906,803 A | * | 5/1999 | Lppalahti ..................... 423/237 |
| 6,176,079 B1 | * | 1/2001 | Konrad et al. ................. 60/274 |

* cited by examiner

Primary Examiner—Christopher A. Fiorilla

(57) ABSTRACT

A method for utilizing ultra-thin catalytic monoliths, internal molding and high concentrations of reactive catalytic species to exploit the unique high surface area of Aerogels in order to achieve catalytic selectivity of the desired gas phase heterogeneous reaction.

2 Claims, 1 Drawing Sheet

Figure 1:
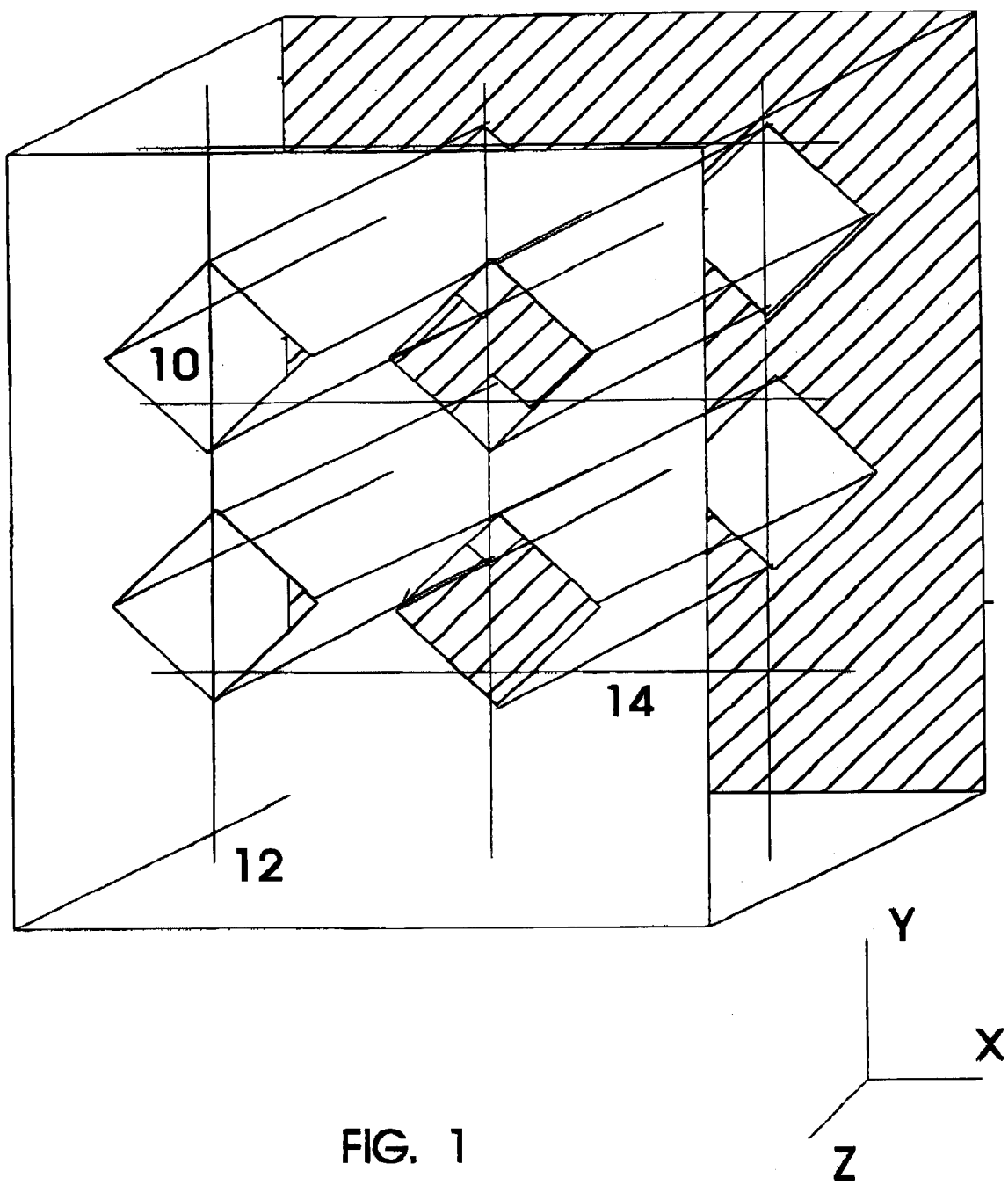

METHOD OF USING AEROGEL HONEYCOMB CATALYST MONOLITHS FOR SELECTIVE CATALYTIC REACTION OF GAS PHASE CHEMICAL SPECIES

This is a division of Ser. No. 08/761,649, filed Dec. 6, 1996, now U.S. Pat. No. 5,972,254. Subject matter directed exclusively to the parent case has been deleted, editorial amendments to the specification are shown in italics.

BACKGROUND—FIELD OF THE INVENTION

This invention relates to monolithic aerogel catalysts and composite materials, specifically to the use of ultra-thin aerogel honeycomb catalyst monoliths for selective catalytic reaction of gas phase chemical species.

BACKGROUND—DESCRIPTION OF PRIOR ART

Aerogel catalysts are generally used in the form of fine powders or lumps which are fragile, loose, and difficult to handle in chemical reactors. Severe pressure drops and heat and mass transfer limitations occur in fixed bed reactors where Aerogels are used in these types of physical forms. Other alternative forms such as Aerogel coatings on Rashig rings or Aerogels being embedded into alundum boiling stones have been tried with limited success to assist in improving on the above limitations. Fluidized bed reactors have also been piloted using the "lumps" form of Aerogels with limited success.

European Patent Number #0186149 by Stauffer Chemical Company describes the preparation of non-aged, inorganic oxide containing aerogels. The method comprises the steps of dissolving the alkoxide in a solvent, optionally adding a catalytic amount of a base or acid, and hydrolyzing the metal compound to produce a gel. The solvent in the gel is exchanged with an extraction fluid, and the fluid in the gel is supercritically extracted to form an aerogel. The patent describes the preparation of amorphous, granular metal oxide aerogels, rather than monolithic forms.

Transparent Metal Oxide Aerogel Monoliths have been successfully formed by Lawrence Livermore National Laboratory, U.S. Pat. No. 5,395,805 to Droege (1995), in samples approximately 1 inch in diameter and 0.25 inches thick. This type of small monolith has extremely limited commercial catalytic applications due to its essentially inaccessible internal surface area. The pressure drop that is required to access the internal surface area is tremendously high. Per the LLNL patent, the fabrication of these small monoliths requires a containment vessel that is sealed in such a way as to be gas permeable.

Conventional Honeycomb Monolith Chemical Reaction beds for NOx reduction are typically at least 20 feet in depth (a 20 foot superficial gas flow path) and have the disadvantages of relatively high pressure drop, laminar flow in the honeycomb channels, and active catalyst surface limited to the surface washcoating of the catalyst impregnated on a ceramic honeycomb monolith.

Current catalyst pore structures depend on the micropore and macropore structure of the material of the base monolith and the ability to uniformly apply a washcoat of material over the monolith. Washcoat connections with the support via thin branches in small pores are highly vulnerable to thermal stress cracking. Typical internal surface areas for a Titania monolith are approximately 50 M2 per gram of material. The washcoat layer surface area is normally in the range of 100 to 200 M2 per gram of material. Once a thin washcoat has been poisoned by materials such as alkalies and sulfur oxides, the catalyst will be deactivated.

A conventional composition for a NOx reduction catalyst that utilizes ammonia for its reduction agent is in the range of four to eight weight percent Vanadium Oxide or Tungsten Oxide coated over a Titania monolith. The current commercial catalysts have a formulation tradeoff limitation between more Vanadium which increases the activity toward NOx reduction but also increases the activity of the unwanted oxidation reaction of SO2 to SO3. SO3 combines with the ammonia to form ammonium bi-sulfate or ammonium sulfate which can cause corrosion and plugging of the downstream heat exchange equipment. The Vanadium Oxide allows activity toward NOx in lower operating temperature zones than the Tungsten Oxide.

Aerogel Matrix composites using fibers dispersed within the bulk aerogel have been successfully formed by Battelle Memorial Institute U.S. Pat. No. 5,306,555 to Ramamkurthl (1994). These samples were formed with a high weight percentage of fibers, from 9 to 35, and had relatively low surface areas from 147 to 303 M2 per gram of material.

Although these related patents discuss the formulation of metal oxide Aerogels and methods of fabrication of small Arogel monoliths over long time periods (days), none address the practical application of Aerogels as catalysts. Economic fabrication techniques for Aerogel catalyst sections where the inherently large internal surface area characteristics can be fully exploited at low pressure drops in gas reacting systems are not addressed. The present invention addresses the need for a catalyst that allows Selective Catalytic Reduction of NOx by using large Ultra-Thin Honeycomb Aerogel catalyst sections that allow the unique surface area of Aerogels to be fully exploited at very low gas pressure drops.

OBJECTS AND ADVANTAGES

The following lists several Objects and Advantages of the invention:

(a) The Ultra-Thin Aerogel Honeycomb Monolith has flow through gas channels that will allow the chemical reactants to access the entire internal surface area of the Aerogel Catalyst with minimal pressure drop.

(b) Space velocities are nearly an order of magnitude greater than conventional catalysts, this allows for extremely thin catalyst sections to be effectively utilized.

(c) The Ultra-Thin catalyst crossection will allow a much greater effective mass transfer coefficient.

(d) The combination of advantages (b) and (c) will allow the reactor catalyst section to be more highly selective toward the reduction of NOx versus the unwanted side reaction of oxidation of SO2 to SO3.

(e) The Aerogel catalyst will have much greater life than conventional washcoated catalyst due to its homogeneous nature, and the entire monolith surface being chemically reactive.

(l) Zirconium was added to the Transition Metal Oxides mix of Vanadium and Tungsten to create site dislocations in the crystalline structure of the catalytic surface and thereby increase reactive surface area.

DRAWING FIGURES

FIG. 1 shows an ultra thin fiber reinforced Aerogel honeycomb monolith section with flow through gas channels.

REFERENCE NUMBERS IN DRAWINGS

10 flow through gas channel
12 Y axis direction reinforcing fiber
14 X axis direction reinforcing fiber

DESCRIPTION OF INVENTION

These innovations described in this patent application were first disclosed in Disclosure Documents 372026 and 373560 with recorded filing dates of Mar. 3, 1995 and Apr. 3, 1995 respectively.

The Composite Aerogel Matrix Honeycomb Monolith is comprised primarily of the Titanate Anatase that is polymerized from the metal alkoxides involved in the Transition Metal Mixed Oxide Aerogel process and some type of reinforcing fiber that will be compatible with highly oxidizing high temperature environments. The Ultra-Thin Honeycomb Monolith has flow through gas channels 10 as illustrated by FIG. 1 that will allow the chemically reacting species to fully access and take complete advantage of the surface within the Aerogel at a minimum pressure drop. Typical surface areas for these monolith Aerogels are 400 to 1000 M2 per gram of material. Because the Aerogel is comprised of a homogeneous mixture of Mixed Transition Metal Oxide materials, all the internal surface area throughout the Honeycomb Matrix is a catalytic site. It approaches being the ultimate in a catalytic material, since all the surface area, both external and internal is reactive. The Ultra-Thin catalyst bed and its extremely low pressure drop has tremendous operating cost advantages for all low pressure, high gas flow reaction systems such as the selective catalytic reduction of NOx and complete oxidation of Carbon Monoxide and Hydrocarbons.

Being able to practically access the extremely high reactive surface area of the Aerogel and the ability to fabricate a homogeneous reacting monolith will allow a number of innovative advances. Space velocities that are in the range of an order of magnitude greater than conventional NOx reduction catalyst can be achieved. This allows extremely thin sections of catalyst monolith to be utilized (for example eight centimeters thick by one meter square). The thin cross-section of catalyst will allow a much greater effective mass transfer coefficient per unit of pressure drop. This is accomplished by greatly reducing the depth of the boundary layer of the reacting gas on the exposed catalyst surface area as a result of entrance effects of the Honeycomb Monolith Channel, even though the flow velocities and resultant pressure drops are characteristic of the low pressure drop laminar flow region. The entrance flow effects for a Reynolds number of 2000 and flow channel with 0.5 cm characteristic width would take approximately 35 cm to build to a fully developed parabolic flow profile. Thus, by keeping the gas flow path length of the monolith approximately 5 times shorter than the fully developed laminar flow characteristic length, the mass transfer of the reactants through the boundary layer to the active site on the catalyst surface can be maximized. Literature references indicate that this phenomena can double the effective mass transfer coefficient when compared to the fully developed laminar flow that occurs throughout the majority of a conventional NOx selective reduction reaction catalyst bed.

The combination of the increase in effective mass transfer and the order of magnitude space velocity increase will greatly reduce the amount of SO2 that is oxidized to SO3 per unit of NOx reduced. This is due to the fact that the reduction of NOx is mass transfer controlled while the oxidation of SO2 is kinetically controlled. Depending on the temperature of the reaction zone that is chosen, the amount of Vanadium Oxide and Tungsten Oxide that will be permitted in the catalyst will be greatly increased when compared to conventional catalyst systems, thereby allowing greater activity toward the reduction of NOx per unit of catalyst. These innovations allow this reaction system to selectively reduce NOx under fundamentally more favorable process conditions.

The homogeneous extremely high surface metal oxide catalyst matrix that is characteristic of an Aerogel will also allow for much greater catalyst life than conventional washcoated catalytic material. The thermal stresses that will destroy conventional washcoated material and its bond to the supporting substrate are not present in material that is formed in a homogeneous fashion at the micropore level. The complete matrix of the material is also reactive, rather than just a thin washcoat layer. Thus the catalyst poisons are required to diffuse deep into the micropores of the Aerogel structure to deactivate the catalyst. This contrasts with the thin catalytic washcoat where the poisons can readily access the majority of the catalytic surface area.

Aerogel Catalyst Composition for the selective catalytic reduction of NOx with ammonia:

| Metal Oxide | Wt. % (elemental metal*) |
|---|---|
| TiO2 | 70 to 90 |
| WO3 | 5 to 20 |
| V2O5 | 5 to 20 |
| ZrO2 | 0.5 |

*calculation basis uses only the transition metal element, oxygen is excluded.

Vanadium and Tungsten are active toward selective catalytic reduction on NOx in two regions, V2O5 being more active near 400 C and WO3 being more active near 500 C. ZrO2, by the nature of its size and electron structure is utilized to createdislocations in the crystalline structure of the metal oxide complex and thereby increase the reactive surface area of the transition metal oxide surface. Vanadium and Tungsten have a Cubic Body Centered crystalline structure with atomic radius of 1.92 and 2.0 Angstroms respectively. Zirconium has a Hexagonal crystalline structure with an atomic radius of 2.16 Angstroms.

OPERATION/WORKING INVENTION

The Aerogel honeycomb mold is first prepared by spraying the entire inside surface with an appropriate mold release agent that will not interfere with the ethoxide condensation reaction such as a silicone lubricant. The mold is then assembled by sliding the ceramic tensioning caps per the illustration into the stainless edge slots in the mold. Long, thin needles are then used to thread the reinforcing fibers through the threading holes in the tensioning caps in a similar way to a tennis racquet being strung. These fibers are pre-tensioned to an appropriate amount of force to offset stress induced by the intended pressure drop service load. The pretensioned fiber holes in the mold tensioning caps are plugged in the mold to prevent ethoxide weepage before gelation is initiated.

A metal alkoxide solution is then prepared with the appropriate amount of each metal constituent and the gelation or polymerization reaction catalysed with acid and excess water per methods similar to those described in previous patent U.S. Pat. No. 5,395,805 to Droege (1995) or other literature sources such as *Comprehensive Inorganic*

*Chemistry Reviews in Chemical Engineering*, "Metal Oxide Aerogel Preparation . . . ", or *Advances in Colloid and Interface Science*, "Inorganic Oxide Aerogels" and poured into the mold after mixing.

After gelation or polymerization, supercritical extraction of the remaining water and ethanol from the Aerogel Matrix is carried out. The Ultra-Thin Honeycomb Aerogel Catalyst monolith is then removed and sintered per methods similar to those described in U.S. Pat. No. 5,395,805 to Droege (1995). The sintering removes the remaining organic compounds from the Aerogel Honeycomb Matrix and maximizes the surface area.

The Ultra-Thin Honeycomb Matrix can then be used to catalyse gas phase reactions in high gas flow applications such as combustion turbine Selective Catalytic Reduction of NOx by Ammonia and complete oxidation of Carbon Monoxide in flue gas. The combination of the high space velocities, thin catalyst cross section, high mass transfer rates, high concentration of active catalytic materials, and extremely high Aerogel surface area result in very selective catalytic reduction of NOx versus the unwanted side reaction of SO2 to SO3. Reaction bed pressure drop can also be reduced by an order of magnitude, thereby generating cost savings that quickly offset the cost the retrofit installation. This is especially valid in combustion turbine applications because combustion turbine power output and thermal efficiency is extremely sensitive to the turbine exhaust duct pressure drop.

Other applications in chemical process industries and advanced power production systems such as Molten Carbonate Fuel Cells would achieve equal operating cost savings by using this approach with transition metal oxide Aerogels.

SUMMARY

The use of ultra-thin Aerogel catalyst honeycomb monolith in conjunction with higher concentrations of catalytically active species and higher space velocities will allow the catalytic properties of the Aerogel material to be full exploited. Highly reactive, ultra low pressure drop applications should be possible with the above invention. Practical examples of these applications include selective reduction of Nitrogen Oxides, and complete oxidation of Carbon Monoxide and Hydrocarbons in gas streams by the use of Mixed Transition Metal Oxide Aerogel Catalyst Monoliths.

I claim:

1. A method for achieving catalytic selectivity for nitrogen oxides ($NO_x$) reduction applications in flue gas streams such that the unwanted sulfur dioxide ($SO_2$) to sulfur trioxide ($SO_3$) reaction is minimized comprising:

(a) preparing a thin aerogel catalytic monolith with internal surface area and flow through gas channels, said monolith being reinforced with pre-tensioned fibers;

(b) placing said aerogel catalytic monolith in the flue gas stream such that the flow through gas channels permit the $NO_x$,($SO_2$, and ammonia in the flue gas to fully access the internal surface area of the catalytic material;

(c) causing said flue gas stream containing $SO_2$, $NO_x$, ammonia, and constituents typically occurring in flue gas to flow through the gas channels in the aerogel catalytic monolith;

(d) selectively reacting said ammonia with the $NO_x$ on the catalyst surface inside the aerogel catalytic monolith gas channels while minimizing the amount of $SO_2$ that is oxidized on the catalyst surface to Sulfur Trioxide ($SO_3$);

wherein the length of said gas channels is approximately five times less than the length necessary for fully developed laminar flow; the catalytic material in the said aerogel catalytic monolith consists of an aerogel comprised of a mixture with the following weight percent composition range, $TiO_2$ 70 to 90, $WO_3$ 5 to 20, $V_2O_5$ 5 to 20, and $ZrO_2$ 0.5.

2. A method for achieving catalytic selectivity in nitrogen oxides ($NO_x$) reduction applications such that the unwanted sulfur dioxide ($SO_2$) to sulfur trioxide ($SO_3$) reaction is minimized in claim 1, wherein the said catalytic honeycomb monolith is homogeneous in nature to ensure that all available surface area is reactive.

* * * * *